US009254611B2

(12) United States Patent
Walker

(10) Patent No.: US 9,254,611 B2
(45) Date of Patent: Feb. 9, 2016

(54) ONE-HANDED COMBINATION TAPE DISPENSER AND APPLICATOR

(71) Applicant: Cory Lee Dean Walker, Plymouth, IN (US)

(72) Inventor: Cory Lee Dean Walker, Plymouth, IN (US)

(*) Notice: Subject to any disclaimer, the term of this patent is extended or adjusted under 35 U.S.C. 154(b) by 0 days.

(21) Appl. No.: 14/506,859

(22) Filed: Oct. 6, 2014

(65) Prior Publication Data

US 2015/0053342 A1    Feb. 26, 2015

Related U.S. Application Data

(62) Division of application No. 13/540,819, filed on Jul. 3, 2012, now Pat. No. 8,875,769.

(51) Int. Cl.
*B29C 65/50* (2006.01)
*B65H 35/07* (2006.01)
*B65H 35/00* (2006.01)

(52) U.S. Cl.
CPC ......... *B29C 65/5007* (2013.01); *B29C 65/5092* (2013.01); *B65H 35/0026* (2013.01); *B65H 35/0033* (2013.01); *Y10T 156/1052* (2015.01); *Y10T 156/1348* (2015.01); *Y10T 156/1365* (2015.01); *Y10T 156/1788* (2015.01); *Y10T 156/1795* (2015.01); *Y10T 156/18* (2015.01)

(58) Field of Classification Search
CPC .................. B32B 37/0046; B29C 2793/0027
See application file for complete search history.

(56) References Cited

U.S. PATENT DOCUMENTS

| 3,150,027 | A | 9/1964 | Moyer |
| 3,187,968 | A | 6/1965 | Favre |
| 3,727,868 | A | 4/1973 | Buchanan |
| 3,740,299 | A | 6/1973 | Schroter et al. |
| 4,104,110 | A | 8/1978 | Macosko |
| 4,262,835 | A | 4/1981 | Wrobel |
| RE32,010 | E | 10/1985 | Collins |
| 4,582,558 | A | 4/1986 | Antonson |
| 4,642,157 | A | 2/1987 | Cavanagh |
| D310,846 | S | 9/1990 | Sakurai |
| 5,083,717 | A | 1/1992 | Samuelson et al. |
| D328,097 | S | 7/1992 | Czech |
| 5,171,397 | A | 12/1992 | Arnold |
| 5,228,612 | A | 7/1993 | Kuo et al. |
| 5,288,362 | A | 2/1994 | Shuh-Chin |
| 5,326,421 | A | 7/1994 | Taylor |
| D357,502 | S | 4/1995 | Schwarz et al. |
| 5,482,182 | A | 1/1996 | Thompson et al. |
| 5,759,342 | A | 6/1998 | Luhman et al. |
| 5,792,310 | A | 8/1998 | Thompson et al. |
| RE36,143 | E | 3/1999 | Kind et al. |
| 5,904,806 | A | 5/1999 | Mendelovich et al. |
| D416,582 | S | 11/1999 | Dunshee et al. |
| D438,567 | S | 3/2001 | Van Den Berg |
| 6,386,416 | B1 | 5/2002 | Dunshee et al. |
| D463,825 | S | 10/2002 | Carlson et al. |
| 6,510,884 | B1 | 1/2003 | Chan |

(Continued)

*Primary Examiner* — Linda L Gray
(74) *Attorney, Agent, or Firm* — Woodard, Emhardt, Moriarty, McNett & Henry LLP

(57) ABSTRACT

A combination adhesive tape dispenser/applicator for one-handed dispensing of pressure sensitive adhesive tape from a roll and simultaneously applying the tape to a substrate. The combination tape dispenser/applicator allows all operations to be performed single-handedly, and without the user ever having to directly touch the tape. In addition, there is no need to pre-measure or estimate the length of tape needed as the desired length of tape is dispensed as it is being applied to the substrate.

3 Claims, 4 Drawing Sheets

(56) References Cited

U.S. PATENT DOCUMENTS

| | | | |
|---|---|---|---|
| 6,681,830 B1 | 1/2004 | Vulpitta et al. |
| D486,521 S | 2/2004 | Crawford et al. |
| 6,712,113 B1 | 3/2004 | Peggion |
| D507,020 S | 7/2005 | Mueller et al. |
| 6,971,431 B2 | 12/2005 | Steinberger |
| 7,017,639 B2 | 3/2006 | McDonald |
| 7,077,185 B2 | 7/2006 | Steinberger |
| D526,685 S | 8/2006 | Carlson et al. |
| D528,602 S | 9/2006 | Carlson et al. |
| D529,093 S | 9/2006 | Gullicks et al. |
| D541,864 S | 5/2007 | Porcini et al. |
| D543,239 S | 5/2007 | Suzuki |
| 7,228,882 B2 | 6/2007 | Marschand et al. |
| 7,255,767 B2 | 8/2007 | Rice et al. |
| D552,179 S | 10/2007 | Thorsteinsson |
| D553,685 S | 10/2007 | Thorsteinsson et al. |
| 7,370,782 B2 | 5/2008 | Thompson et al. |
| 7,441,581 B2 | 10/2008 | Pitzen |
| D579,981 S | 11/2008 | Maczuzak et al. |
| D580,497 S | 11/2008 | Dureiko et al. |
| 7,676,948 B2 | 3/2010 | Miles |
| D636,439 S | 4/2011 | Livingstone et al. |
| D638,880 S | 5/2011 | Rashid et al. |
| D640,325 S | 6/2011 | Broen et al. |
| D645,087 S | 9/2011 | Fung et al. |
| 2002/0056526 A1 | 5/2002 | Kelders et al. |
| 2004/0194896 A1 | 10/2004 | Steinberger |
| 2005/0284583 A1 | 12/2005 | Soyad |
| 2006/0191642 A1 | 8/2006 | Chern |
| 2007/0014956 A1 | 1/2007 | McCarthy |
| 2007/0158017 A1 | 7/2007 | Rice et al. |
| 2008/0083487 A1 | 4/2008 | Moss et al. |
| 2010/0200633 A1 | 8/2010 | Hsu et al. |

ONE-HANDED COMBINATION TAPE DISPENSER AND APPLICATOR

RELATED APPLICATIONS

This application is a divisional of U.S. application Ser. No. 13/540,819, filed Jul. 3, 2012, entitled One-Handed Combination Tape Dispenser and Applicator, which is hereby incorporated by reference in its entirety.

FIELD OF THE INVENTION

The present invention relates to roll-type adhesive tape (variable length, reusable/refillable) dispensers (no pre-cut lengths of tape) and, more particularly, to hand held tape dispensers that can be manually operated with the use of only one hand to dispense, apply and cut a desired variable length of adhesive tape without the operator having to touch the tape.

BACKGROUND

An adhesive tape dispenser is a device that holds a roll of adhesive tape and has a cutter mechanism at one end to sever the tape from the roll. The design and construction of adhesive tape dispensers vary widely based on the type of tape they dispense and the nature of use. One of the most common of such devices are clear adhesive tape, also commonly referred to as "cellophane" or "scotch" tape, dispensers designed for general household and/or light duty office use. These types of dispensers are commonly made of plastic, are small enough so that the dispenser, with the tape in it, can be easily picked up and manipulated near the point of application, and are intended to be either disposable or refillable depending upon the user's discretion. A further characteristic of conventional cellophane tape dispensers is that they require two-handed "pull and tear" operation. In other words, the user must hold the dispenser with one hand while grasping the adhesive tape with the other hand, then pulling out a desired length of tape from the roll, and tearing or severing the tape using the dispenser's cutting mechanism. The torn off length of tape is then manipulated, often with both hands, in order to apply it at the proper location on the surface of the object being taped. Because the tape is sticky, the user requires a certain degree of dexterity in order to apply the tape properly and without the tape sticking to itself. Oftentimes, the user's fingerprints are left visible on the otherwise clear tape, and if the tape has become stuck to itself it may need to be discarded. Further, dispensing the correct length of tape requires a certain amount of guesswork, either causing wastage when the length cut is greater than the length required, or duplication of effort if the length cut off from the roll is too short.

Over the years, there have been many attempts to improve on the design of conventional adhesive tape dispensers in order to address these and other drawbacks, however, there still remains a need for improvement in this field.

SUMMARY

Based on the disadvantages and limitations described above in the prior art devices for roll type adhesive tape dispensers, it was determined that improvements needed to be made to achieve a combination dispenser and applicator designed for general household and/or light duty office use which would allow for one-handed use, and accurate dispensing and application of the desired length of tape directly on the surface to be applied without the operator needing to touch the tape.

The present inventions are defined by the claims, and only the claims. Further forms, objects, features, aspects, benefits, advantages, and embodiments will become apparent from a detailed description and drawings provided herewith.

DESCRIPTION OF THE ILLUSTRATED EMBODIMENTS

Figure 1:
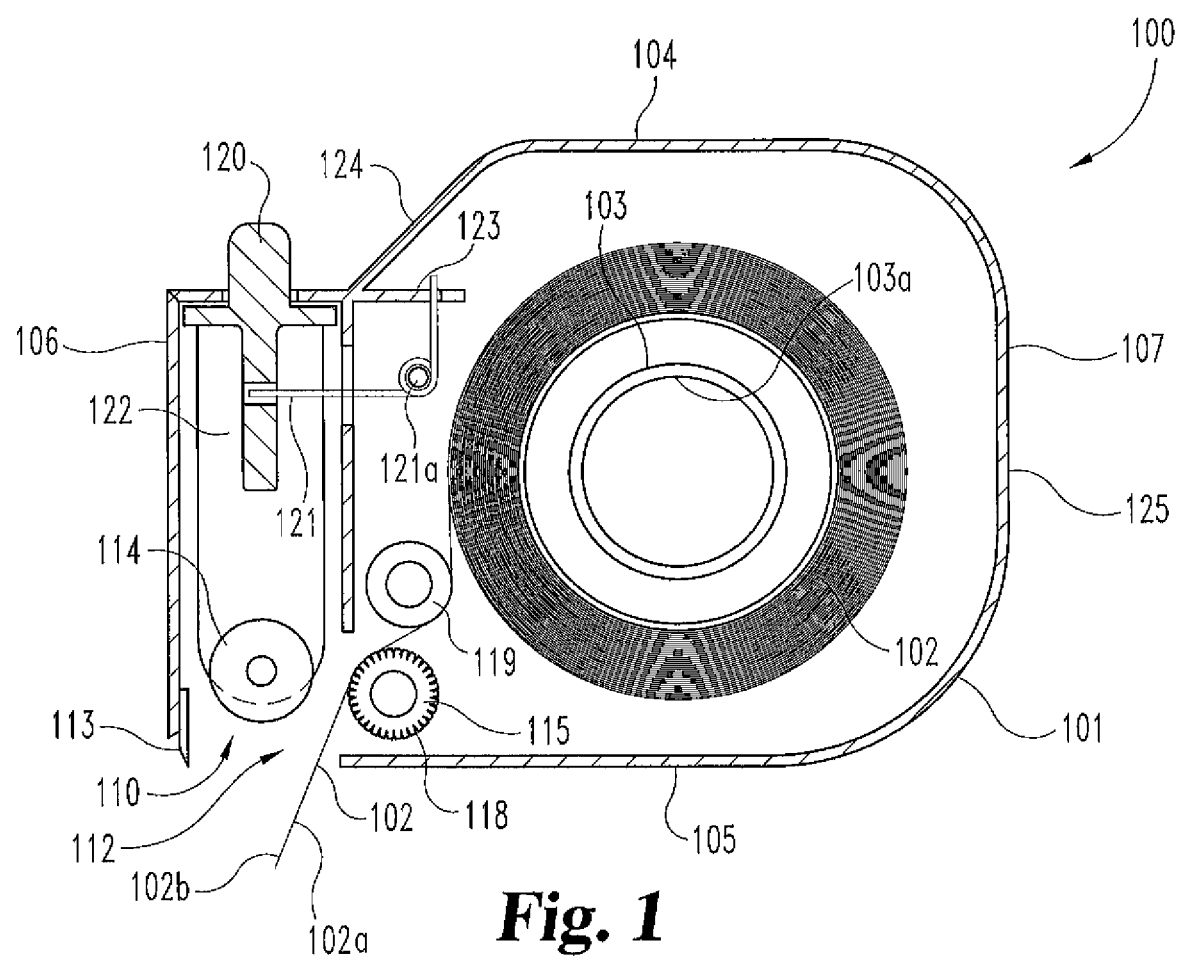
FIG. 1 is a side elevation view showing internal details of the construction of one embodiment of the combination tape dispenser/applicator of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the specification and claims, it should be noted that the singular forms "a", "an", "the", and the like include plural referents unless expressly discussed otherwise. As an illustration, references to "a device" or "the device" include one or more of such devices and equivalents thereof. The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

As used in the claims and the specification, the following terms have the following definitions:

The term "tape dispenser/applicator" as used herein means a device that both dispenses tape and functions to assist a user in applying the tape to a surface or substrate.

The term "serrations" as used herein means a formation of notches, grooves, teeth and/or other surface indentations or formations.

The language used in the claims and the written description is to only have its plain and ordinary meaning, except as explicitly defined above. Such plain and ordinary meaning is inclusive of all consistent dictionary definitions from the most recently published (as of the filing date of this application) general purpose Webster's dictionaries and Random House dictionaries.

Referring now to the drawings, an adhesive tape dispenser/applicator 100 according to one embodiment of the present invention is illustrated generally in FIG. 1. As illustrated in FIG. 1, dispenser/applicator 100 has an ergonomically shaped housing 101 sized and formed to be handheld for one-handed dispensing of a roll of pressure sensitive adhesive tape 102 mounted on a spool holder 103 inside the housing 101. The adhesive tape 102 may come in a variety of conventionally known sizes and types of one-side pressure sensitive adhesive tape having an adhesive side 102a and non-adhesive side 102b. In order to allow for refilling the dispenser/applicator 100 with a new roll of tape 102, the housing 101 may be formed in a conventional manner to be split apart or otherwise opened to access the empty roll and refill. The housing 101 may be formed with any of a variety of suitable materials including plastic, metals, wood, etc.

and come in different translucent, transparent, or solid colors and shapes. The housing 101 may optionally include a circular through passageway 103a on the axis of spool holder 103 to further facilitate manipulation of the dispenser/applicator 100.

Figure 2:
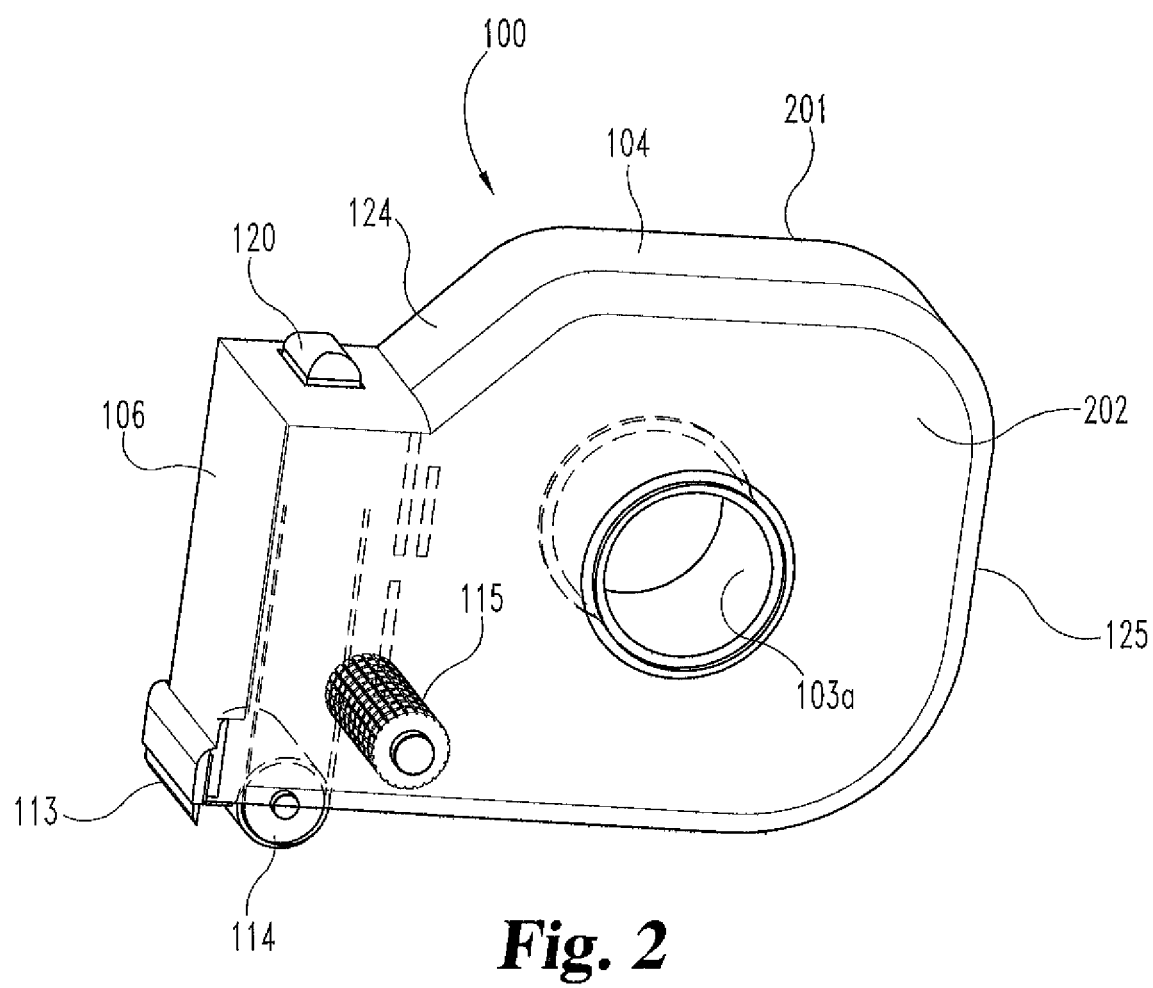
FIG. 2 is a perspective view of the combination tape dispenser/applicator of FIG. 1.

Referring now also to FIG. 2, the housing 101 has a top surface 104, a bottom surface 105, forward and rearward ends 106 and 107, and side surfaces 201 and 202, respectively. The bottom facing surface 105 includes a flat bottom portion to allow the dispenser/applicator 100 to be stood in an upright orientation on a substantially flat support surface or substrate as the tape is applied to it. The adhesive tape 102 is substantially enclosed inside the housing 101 except for a small tape dispensing opening 110 in the bottom facing surface 105 of housing 101.

Figure 4:
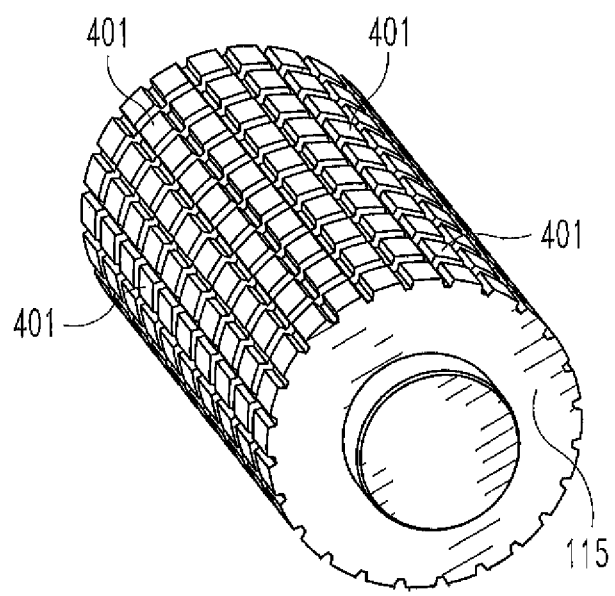
FIG. 4 is a perspective view of one embodiment of the guide roller with serrations for contacting the adhesive side of the tape.

Mounted inside and/or to the housing 101 is a tape applicator/cutter assembly 112. The tape applicator/cutter assembly 112 includes a cutter 113, an applicator roller 114 and a guide roller 115. The applicator roller 114 is positioned to pressingly contact the non-adhesive side 102b of the tape 102 against the application surface or substrate. The guide roller 115 is positioned to guide the advancement of the adhesive side 102a of the tape 102 as the tape is dispensed from the roll. The guide roller 115 is rotatably mounted on an axis 117 and may have a plurality of longitudinal serrations 118 extending along the circumference of the guide roller 115 for facilitating dispensing of tape from the dispenser/applicator 100. The precise size, shape and positioning of the serrations 118 may vary, it being important only that they are shaped and formed as needed to limit the amount of contact area between the guide roller 115 and the adhesive side 102a of the tape 102 to that needed to smoothly guide advancement of the tape while not allowing the tape to stick to the roller 115 so as to cause any binding of movement. In one embodiment shown in FIG. 4, the serrations 118 are formed as teeth 401. The teeth 401 are seen in FIG. 4 as relatively rounded or flattened, but could also be of other conventionally known configurations. An additional guide roller 119, may optionally also be provided to facilitate the guiding of tape from the roller. Guide roller 119 contacts the non-adhesive side of the tape 102 and so may serve to facilitate the guiding function without the need for serrations seen on guide roller 115.

The tape applicator/cutter assembly 112 further has a finger actuated button 120 with a spring release 121 and a button guide 122 mounting the button 120 and applicator roller 114. The button guide 122 guides the movement of the button 120 and applicator roller 114 relative to the housing 101. Preferably, the button guide 122 provides for a smooth linear guiding movement of the finger actuated button 120. The finger actuated button 120 is positioned towards the forward end 106 of the housing 101 along the top surface 104. The finger actuated button 120 is configured to actuate relative movement between the applicator roller 114 and the guide roller 115 prior to the cutter 113 severing a length of tape from the roll. As seen in FIG. 1, the spring release 121 may be a torsion spring mounted on bar 121a that biases the button 120 upwardly to its normal undepressed position. A spring catch 123 holds tension on the back of the spring keeping the button 120 in its normal position when not in use. When the button 120 is depressed, applicator roller 120 moves downwardly to contact the non-adhesive side 102a at the free end of the tape 102 and cause the tape to be applied to the substrate as the dispenser/applicator 100 is moved rearwardly over the surface of the substrate.

Figure 3:
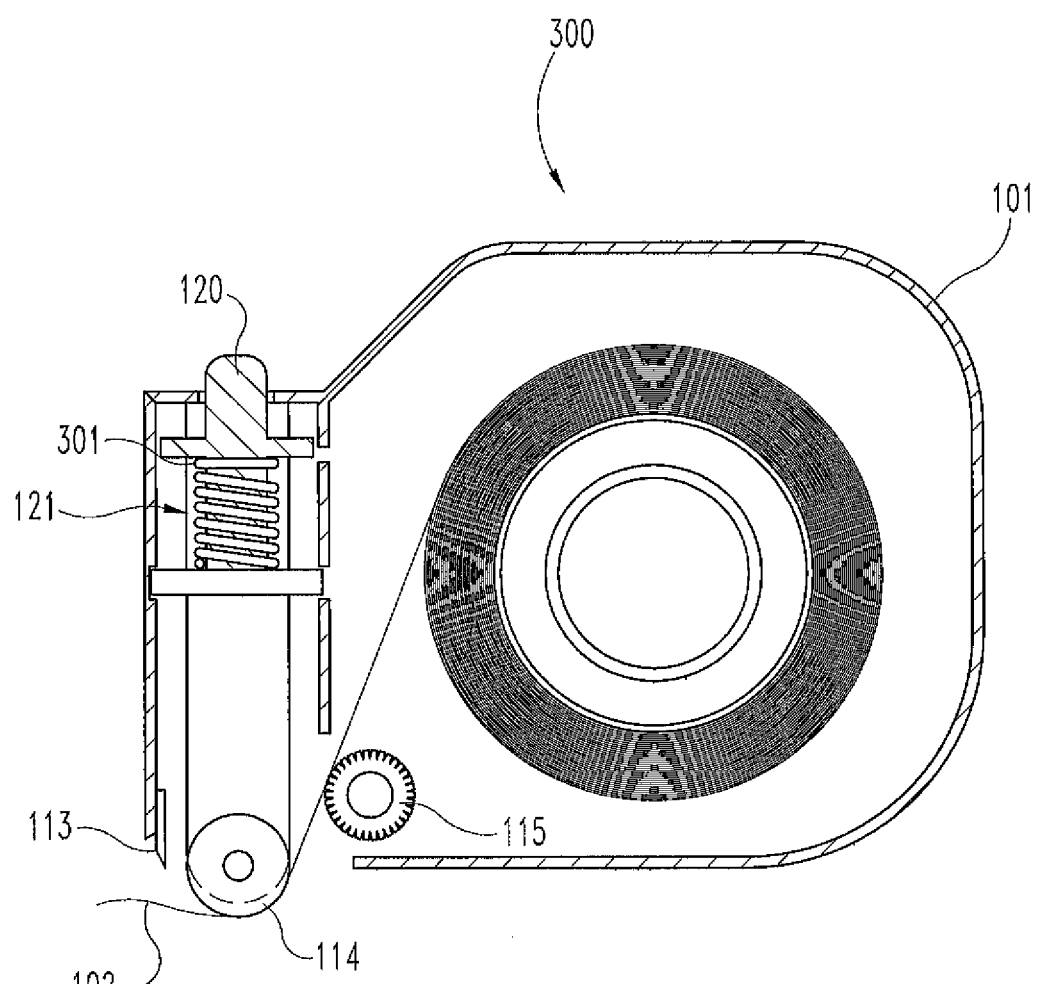
FIG. 3 is a side elevation view showing internal details of an alternate embodiment of the construction of the combination tape dispenser/applicator of the present invention.

FIG. 3 depicts a further embodiment of the dispenser/applicator 300 having only one guide roller 115 and providing a different spring release arrangement for the finger actuated button 120. As shown in FIG. 3, the spring release 121 is provided by a compression spring 301 mounted below the button 120.

Returning to FIGS. 1 and 2, at least a portion of the top surface 104 of the housing 101 forms an inclined surface 124. The finger actuated button 120 is positioned between the applicator roller 114 and the inclined surface 124 of the housing 101. At least a portion of the rearward end 107 of the housing 101 includes a flat rearward facing surface 125 adapted to support the adhesive tape dispenser/applicator 100 in an alternate orientation on a substantially flat support surface, e.g., table top or desk, that prevents tape adjacent the tape dispensing opening 110 from contacting the support surface when the dispenser/applicator 100 is not in use. The tape applicator/cutter assembly 112 is configured to dispense tape by engagement with the applicator roller 114 as the housing 101 is moved or glided rearwardly over the substrate.

The method for single-handedly dispensing a desired length of pressure sensitive one-sided adhesive tape from a roll and applying the tape to a substrate may be performed as follows. The user grasps the tape dispenser such as 100 in one hand with the index finger on the finger button and single-handedly places the applicator roller 114 flat on the substrate. While still grasping the tape dispenser in one hand with the index finger on the finger button 120, the user moves the tape dispenser 100 rearwardly across the substrate so as to simultaneously dispense tape 102 from the roll and apply the pressure sensitive adhesive tape to the substrate. The rearward movement may be accomplished by a sliding or gliding movement of the tape dispenser 100. The user then stops the rearward movement of the tape dispenser 100 when a desired length of tape 102 has been applied to the substrate. Once the rearward movement is stopped, the user actuates the finger button 120 to move upwardly to initiate cutting of the applied length of tape 102 from the roll with the cutter 113.

The above described steps are each performed single-handedly, and without the user ever having to directly touch the tape. In addition, there is no need to pre-measure or estimate the length of tape needed as the desired length of tape is dispensed as it is being applied to the substrate. Accordingly, less tape is wasted and the tape is stored and applied in a more sanitary manner. In addition the applied tape is not made unsightly because the user's fingerprints are never left visible on otherwise transparent clear tape. Moreover, the tape dispenser/applicator is designed so that the amount of exposed tape is much less, and can be conveniently stored on a table top or desktop when not in use without any exposed tape touching the support surface.

While at least one embodiment has been illustrated and described in detail in the drawings and foregoing description, the same is to be considered as illustrative and not restrictive in character, it being understood that the preferred embodiment has been shown and described and that all changes, equivalents, and modifications that come within the spirit of the inventions defined by following claims are desired to be protected. It will be evident from the specification that aspects or features discussed in one context or embodiment will be applicable in other contexts or embodiments. All publications, patents, and patent applications cited in this specification are herein incorporated by reference as if each individual publication, patent, or patent application were specifically and individually indicated to be incorporated by reference and set forth in its entirety herein.

What is claimed is:

1. A method for single-handedly dispensing a desired length of pressure sensitive one-sided adhesive tape from a roll and applying the tape to a substrate, comprising:

providing a tape dispenser having an ergonomically shaped housing and a tape applicator/cutter assembly mounted to said housing, said tape applicator/cutter assembly having a cutter, a finger button, an applicator roller and a guide roller;

single-handedly placing the tape dispenser flat on a substrate;

single-handedly moving the tape dispenser rearwardly across the substrate so as to simultaneously dispense pressure sensitive adhesive tape from the roll and apply the pressure sensitive adhesive tape to the substrate;

stopping the single-handed rearward movement of the tape dispenser when a desired length of tape has been applied to the substrate; and actuating the finger button to actuate relative movement between the applicator roller and the guide roller prior to the cutter severing a length of tape from the roll without the applicator roller directly engaging the cutter.

2. The method of claim 1 wherein the method further includes:

providing the housing with top, bottom and side surfaces and forward and rearward ends, the bottom facing surface being formed to support the tape dispenser in an upright orientation on a substantially flat support surface when facing the support surface, the housing further having a tape dispensing opening in the bottom surface, and wherein the placing and moving steps are performed while contacting the finger button with the user's index finger.

3. The method of claim 2 wherein the method further includes:

actuating the finger button to move upwardly to initiate cutting of the applied length of tape from the roll with the cutter.

* * * * *